United States Patent [19]
Carlson

[11] Patent Number: 5,884,213
[45] Date of Patent: Mar. 16, 1999

[54] SYSTEM FOR CONTROLLING NAVIGATION OF A FISHING BOAT

[75] Inventor: Ben Anthony Carlson, Racine, Wis.

[73] Assignee: Johnson Worldwide Asociates, Inc., Wis.

[21] Appl. No.: 621,208

[22] Filed: Mar. 22, 1996

[51] Int. Cl.⁶ .......................... G01C 21/20; G06G 07/78
[52] U.S. Cl. .......................... 701/206; 701/116; 701/202; 701/213; 114/144 A
[58] Field of Search ..................... 701/116, 201, 701/202, 203, 206, 213, 224; 114/144 A, 144 B, 144 E

[56] References Cited

U.S. PATENT DOCUMENTS

| | | | |
|---|---|---|---|
| 3,952,681 | 4/1976 | Tucker | 114/144 A |
| 4,253,149 | 2/1981 | Cunningham et al. | 701/219 |
| 4,428,052 | 1/1984 | Robinson et al. | 701/116 |
| 4,442,786 | 4/1984 | Conners | 114/255 |
| 4,454,583 | 6/1984 | Schneiderhan et al. | 343/432 |
| 4,519,335 | 5/1985 | Krautkremer et al. | 114/144 R |
| 4,542,464 | 9/1985 | Kramer | 114/144 E |
| 4,893,127 | 1/1990 | Clark et al. | 342/386 |
| 5,041,029 | 8/1991 | Kulpa | 440/1 |
| 5,050,519 | 9/1991 | Senften | 114/144 E |
| 5,063,381 | 11/1991 | Ito | 340/984 |
| 5,129,345 | 7/1992 | Senften | 114/144 E |
| 5,172,324 | 12/1992 | Knight | 701/224 |
| 5,202,835 | 4/1993 | Knight | 114/144 E |
| 5,268,844 | 12/1993 | Carver et al. | 701/200 |
| 5,362,263 | 11/1994 | Petty | 440/1 |
| 5,369,589 | 11/1994 | Steiner | 701/205 |
| 5,386,368 | 1/1995 | Knight | 701/116 |
| 5,404,648 | 4/1995 | Taylor, Jr. | 33/431 |
| 5,420,795 | 5/1995 | Greene | 701/200 |
| 5,452,216 | 9/1995 | Mounce | 701/207 |
| 5,491,636 | 2/1996 | Robertson et al. | 701/116 |
| 5,523,951 | 6/1996 | Kriesgman et al. | 701/21 |
| 5,732,385 | 3/1998 | Nakayama et al. | 701/201 |

OTHER PUBLICATIONS

Broadcasting With Digital Audio, pp. 52–59, IEEE Spectrum, Mar. 1996.
Datamarine®The Details Make the Difference (no date).
1994 Defender Industries, Inc. Marine Buyer's Guide (1994) pp. 283–287.
1995 Bass Pro Shop®Marine Catalog (1995), p. 3, pp. 347–349, pp. 304–309.
1996 Motorguide The World's Most Powerful Trolling Motors Catalog.
1996 Boating & Fishing Electronics Buyers Guide.
NavGraphicXL GPS™Navigation and Charting System, Jul. 1994.
1995 Bass Pro Shops®Catalog.
Magellan World Class GPS, 1994.
1996 Vetus®Catalog pp. 2,97–98.
1995 Boat/U.S. The Boater's Advocate Annual Equipment Catalog, 1995.
1995 Fishing & Powerboat Electronics Buyers Guide.

Primary Examiner—Virna Liss Mojica
Attorney, Agent, or Firm—Foley & Lardner

[57] ABSTRACT

A system for controlling the navigation of a fishing boat between waypoints representing successive positions around a navigation route. The system includes an input device for setting the waypoint positions, a position detector to detect the actual position of the fishing boat, a trolling motor to produce a thrust to propel the fishing boat, a steering motor to control the direction of the thrust, and a heading detector to detect the actual heading of the fishing boat. The system also includes a control circuit which determines a desired heading using a desired waypoint and the actual position of the fishing boat, and generates a steering control signal applied to the steering motor to steer the fishing boat from the actual position to the desired waypoint. The system operates in various modes which allow repeated navigation of the fishing boat around a navigation route. The system provides for automatic waypoint storage as the fishing boat is maneuvered around a navigation route.

44 Claims, 2 Drawing Sheets

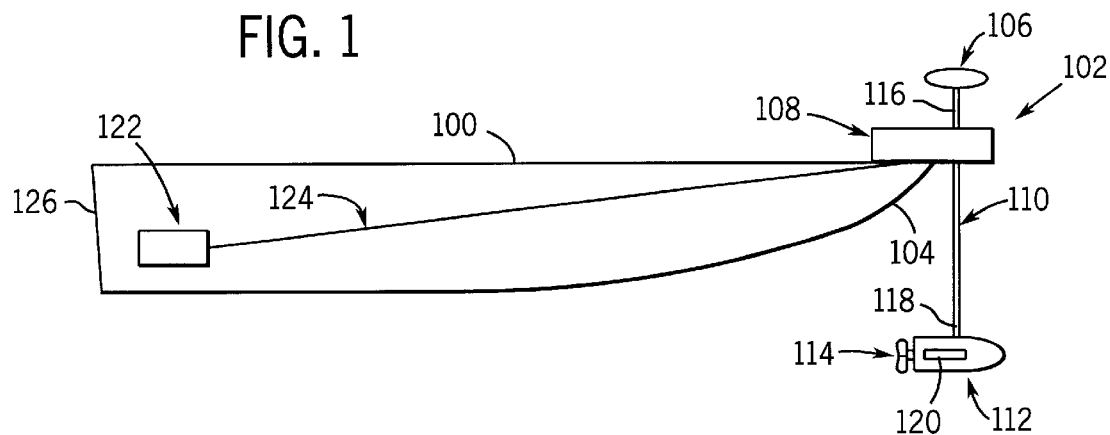
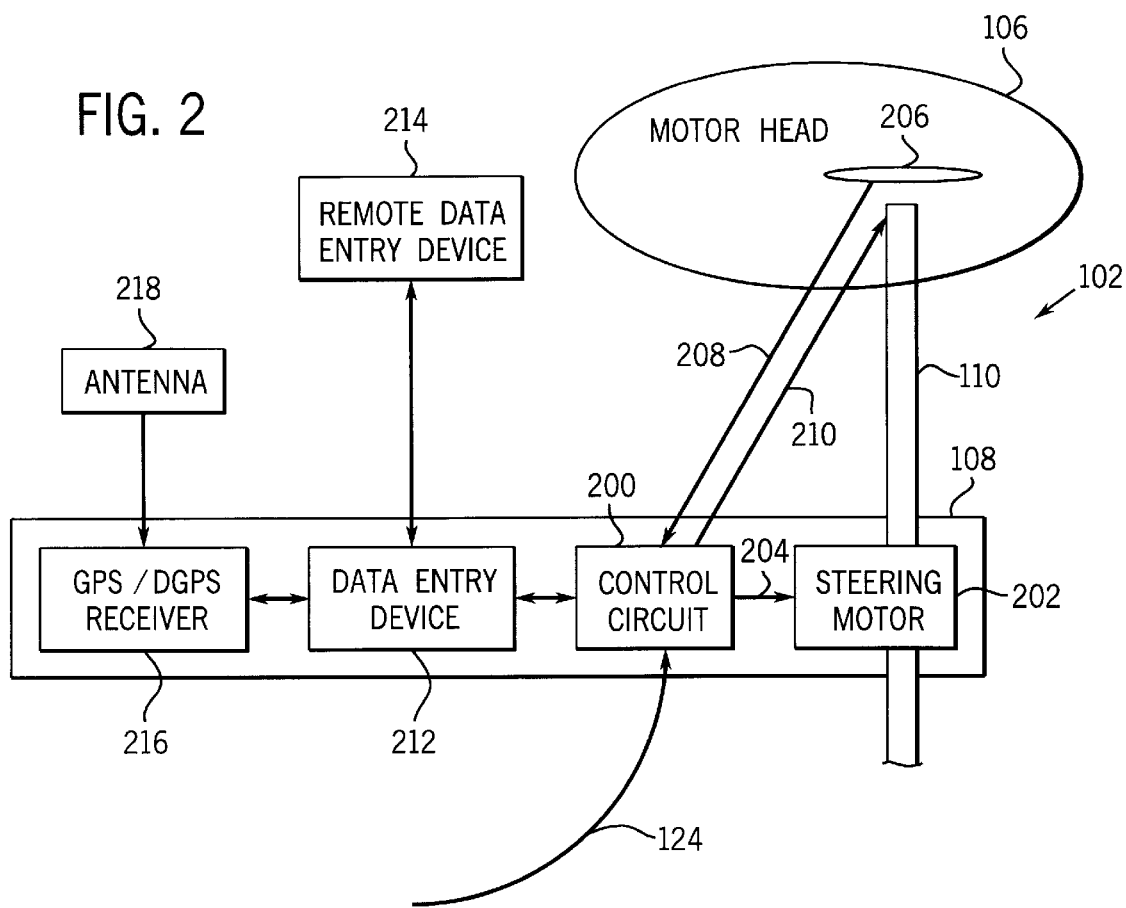

SYSTEM FOR CONTROLLING NAVIGATION OF A FISHING BOAT

FIELD OF THE INVENTION

The present invention relates generally to a system for controlling the navigation of a fishing boat. More particularly, the present invention relates to a system for controlling the orientation of a thrust-producing trolling motor coupled to a fishing boat to navigate the boat between a plurality of waypoints.

BACKGROUND OF THE INVENTION

A recreational fishing boat is often equipped with a trolling motor for propelling the boat through a suspected fish habitat while an operator fishes. The navigation route of the fishing boat through the habitat is selected by the operator based upon a number of factors. The factors typically include the water depth, the water temperature including the location of thermoclines (boundaries between bodies of water with contrasting temperatures), the topography of the bottom including natural or man-made structures, the composition of the bottom (e.g., sand; rocks; weeds), the current and the location of shorelines and/or other above-water obstacles. A desired navigation route may also depend on the need to travel from one location to another, such as from a boat launch pad or dock to the general vicinity of a desired fishing area, or by the operator's experience and intuition. Once a particular navigation route is selected, the operator may desire to repeat the route a number of times while fishing.

Originally, an operator was required to operate a trolling motor manually. However, the attention and time required to operate the trolling motor interfered with the fishing activity itself. In response, a number of systems have evolved to automatically control the operation of a trolling motor, thereby allowing the operator to devote her attention and time to fishing. One known system controls a trolling motor to maintain a selected distance between a fishing boat and a shoreline or fixed structure. Another system controls a trolling motor to maintain a selected water depth beneath a boat. Yet another system controls a trolling motor to maintain a boat at a desired heading. Another system controls a trolling motor to maintain a boat in a fixed position.

Known control systems, however, do not provide an operator with flexibility in setting a desired route. As described above, a desired navigation route may depend on a number of factors combined in various ways at the discretion of the operator. For example, the operator may want to set a navigation route as a fishing boat is manually navigated through a suspected fish habitat while the operator monitors any or all of the above factors. Once a navigation route is selected, the operator may want to repeatedly navigate the fishing boat around the navigation route, either in forward or reverse order, while fishing. It would be advantageous to provide a system that allows an operator to select a navigation route by entering waypoint positions, or waypoints, representing successive positions along the navigation route. Such a system would allow an operator to select waypoints using any factor or combination of factors that is desirable, and would control a trolling motor to navigate a fishing boat between the selected waypoints.

Accordingly, it would be desirable to provide a flexible system for controlling the navigation of a fishing boat equipped with a trolling motor. It would also be desirable to provide a system for controlling the navigation of a fishing boat between a plurality of waypoints representing successive positions around a navigation route. Further, it would be desirable to provide a system for controlling the repeated navigation of a fishing boat around a navigation route. It would also be desirable to provide a system for controlling the navigation of a fishing boat around a navigation route represented by a plurality of waypoints stored manually via a keypad or a switch, downloaded from an electronic chart, or stored automatically by the system based on actual position as an operator navigates around the navigation route.

SUMMARY OF THE INVENTION

In one embodiment, the invention relates to a system for controlling the navigation of a fishing boat between a plurality of waypoints. The system includes a first input device for generating waypoint signals, a position detector for generating signals representative of the actual position of the fishing boat, an electric trolling motor coupled to the fishing boat and producing a thrust to propel the fishing boat, a steering actuator coupled to the electric trolling motor and configured to control the orientation of the electric trolling motor in response to a steering control signal, and a heading detector for generating signals related to the actual heading of the fishing boat. The system also includes a control circuit coupled to the first input device, the position detector, the steering actuator and the heading detector. The control circuit is configured to determine the waypoints based upon the waypoint signals generated by the first input device and to determine the actual position of the fishing boat based upon the signals generated by the position detector. The control circuit is further configured to determine a desired heading based upon a desired waypoint and the actual position of the fishing boat, and to generate the steering control signal to steer the fishing boat based upon the desired heading and the actual heading of the fishing boat.

In another embodiment, the invention relates to a system for controlling the navigation of a fishing boat between a plurality of waypoints. The system includes a position detector for generating signals representative of the actual position of the fishing boat, an electric trolling motor coupled to the fishing boat and producing a variable magnitude of thrust to propel the fishing boat in response to a thrust control signal, a steering actuator coupled to the electric trolling motor and configured to control the orientation of the electric trolling motor in response to a steering control signal, and a heading detector for generating signals related to the actual heading of the fishing boat. The system also includes a control circuit coupled to the position detector, the electric trolling motor, the steering actuator and the heading detector. The control circuit is configured to determine the actual position of the fishing boat based upon the signals generated by the position detector and to determine a desired heading based upon a desired waypoint and the actual position of the fishing boat. The control circuit is further configured to generate the thrust control signal and the steering control signal to navigate the fishing boat to the desired waypoint.

In yet another embodiment, the invention relates to a system for controlling the repeated navigation of a recreational boat around a navigation route, the navigation route including a plurality of waypoints representing successive positions along the navigation route. The system includes a position detector for generating signals representative of the actual position of the boat, a propulsion unit coupled to the boat and producing a thrust to propel the boat, and a steering mechanism configured to control the direction of the thrust produced by the propulsion unit in response to a steering control signal. The system also includes a control circuit coupled to the position detector and the steering mechanism. The control circuit is configured to determine the actual position of the boat based upon the signals generated by the position detector, to generate the steering control signal to steer the boat between successive waypoints along the navigation route, and to repeat the navigation of the boat around the navigation route in at least one mode of operation.

In still another embodiment, the invention relates to a system for controlling the navigation of a recreational boat between a plurality of waypoints. The system includes an input device for enabling automatic waypoint storage, a position detector for generating signals representative of the actual position of the boat, a motor coupled to the boat and producing a thrust to propel the boat, and a steering mechanism configured to control the direction of the thrust produced by the motor in response to a steering control signal. The system also includes a control circuit coupled to the input device, the position detector and the steering mechanism. The control circuit includes a memory for storing the waypoints. The control circuit is configured to determine the waypoints based upon the actual position of the boat and to store the waypoints in the memory when automatic waypoint storage is enabled. The control circuit is further configured to generate the steering control signal to steer the boat from the actual position of the boat to a desired waypoint.

BRIEF DESCRIPTION OF THE DRAWINGS

The invention will become more fully understood from the following detailed description, taken in conjunction with the accompanying drawings, wherein like reference numerals refer to like parts, in which:

FIG. 1 illustrates an electric trolling motor mounted on the bow of a fishing boat and disposed to pull the fishing boat through a body of water.

FIG. 2 is a block diagram of a system for controlling the orientation of a thrust-producing trolling motor coupled to a fishing boat to navigate the fishing boat between a plurality of waypoints.

DETAILED DESCRIPTION OF THE PREFERRED EMBODIMENT

Figure 3:
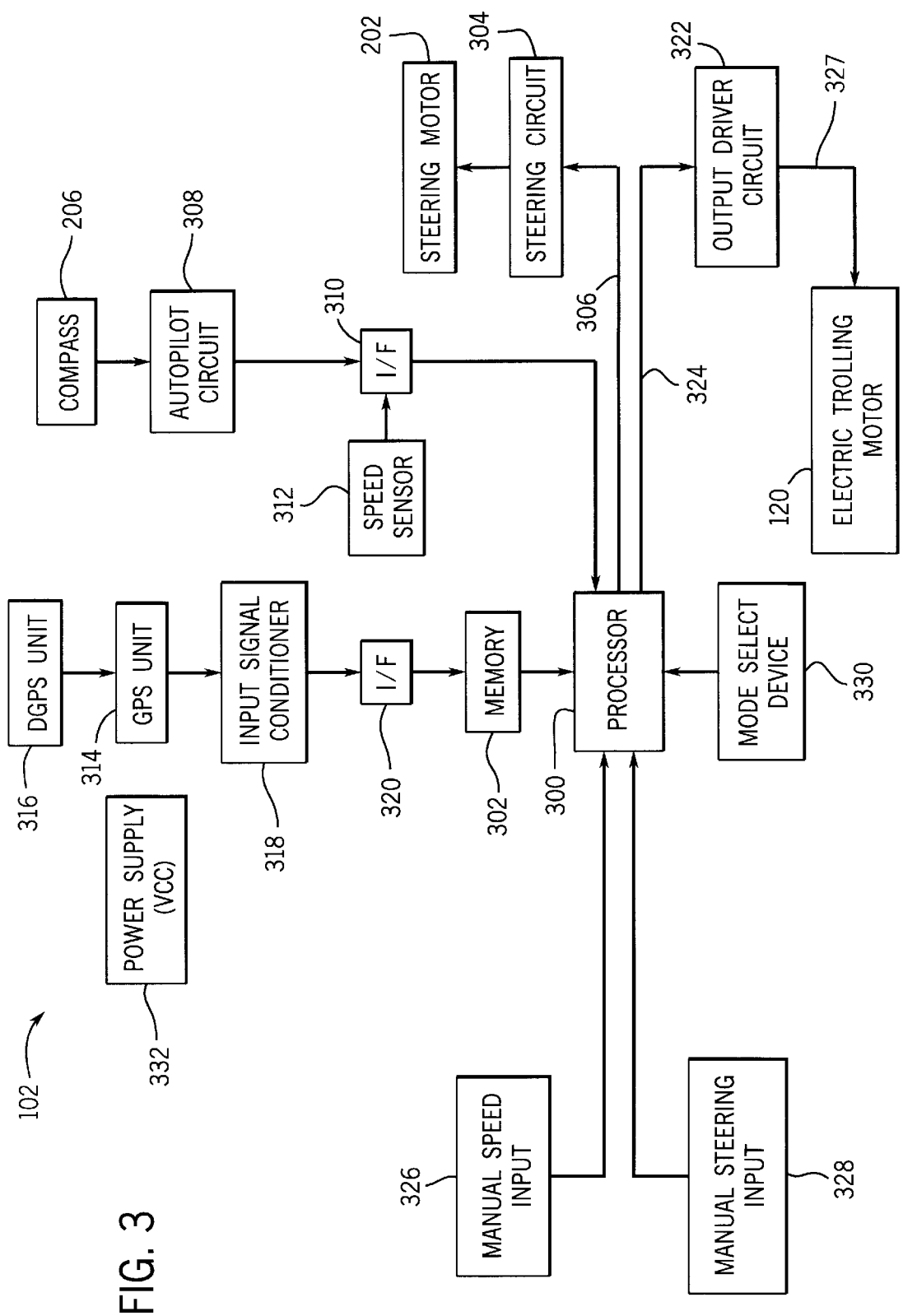
FIG. 3 is a block diagram showing further detail of the system shown in FIG. 2.

A trolling motor and control system combination is described in U.S. Pat. Nos. 5,172,324, 5,202,835 and 5,386,368. These patents are incorporated herein by reference.

Referring to FIG. 1, a fishing boat 100 is equipped with a trolling unit 102 mounted on the bow 104 of fishing boat 100. Trolling unit 102 is mounted using bolts (not shown), a mounting bracket or other convenient manner. The mounting bracket may be configured to permit trolling unit 102 to be raised, typically for transport. Trolling unit 102 includes a motor head 106, a base housing 108, a shaft 110, a lower unit housing 112 and a propeller 114. Shaft 110 passes through base housing 108 such that shaft 110 is rotated by base housing 108 in a manner described below. Shaft 110 has a first end 116 affixed to motor head 106 and a second end 118 affixed to lower unit housing 112 such that motor head 106 and lower unit housing 112 rotate when shaft 110 is rotated. Propeller 114 is affixed to an electric trolling motor 120 mounted inside lower unit housing 112. Housing 112 provides appropriate protection from the water and other elements. When electrical power is applied through shaft 110 as described below, electric trolling motor 120 causes propeller 114 to rotate and produce a thrust. The direction of thrust corresponds to the orientation of electric trolling motor 120 about an axis formed by shaft 110. Thus, the direction of thrust produced by propeller 114 changes as shaft 110 is rotated. The thrust produced by propeller 114 propels fishing boat 100 through a body of water in a direction generally opposite from the direction of thrust, although the actual direction of fishing boat 100 may vary depending on other forces exerted on fishing boat 100, such as forces exerted by the wind or current. Electrical power is provided to trolling unit 102 from a battery 122 via an electrical cable 124. Cable 124 is coupled to base housing 108 and, as described below, provides power for electric trolling motor 120 and for other system components.

In a preferred embodiment, trolling unit 102 is mounted on the bow 104 of fishing boat 100 to improve the handling characteristics of fishing boat 100. When mounted on the bow, for example, trolling unit 102 can orient electric trolling motor 120 and propeller 114 to pull bow 104 sideways through the water with little or no forward movement of fishing boat 100. The ability to turn with a small radius may be important in various situations, such as when following the curves of a shoreline closely or when maneuvering around underwater obstacles. However, trolling unit 102 can also be mounted on the stern 126 of fishing boat 100. Advantages of stern mounting may include easier and more convenient mounting of trolling unit 102 to fishing boat 100, the use of a single propulsion system both for trolling and for normal travel in smaller boats, back trolling, and to accommodate mounting trolling unit 102 to small or other boats which have little or no room for bow-mounting.

In a preferred embodiment, trolling unit 102 includes electric trolling motor 120. However, trolling unit 102 could include other types of propulsion systems. For example, trolling unit 102 could include an internal combustion engine, such as a gasoline-powered outboard motor, coupled with an automatic control system.

Referring to FIG. 2, trolling unit 102 includes a control circuit 200 coupled to a steering motor 202 via a control line 204. Steering motor 202 rotatably engages shaft 110 such that when steering motor 202 is activated by control circuit 200, shaft 110 rotates. The rotation of shaft 110 changes the direction of thrust produced by the rotation of propeller 114. Thus, control circuit 200 controls the direction or heading of fishing boat 100 by transmitting appropriate control signals to steering motor 202. A steering system, including steering motor 202, is described further in the incorporated patents. Alternatively, a hydraulic or other type of steering actuator or mechanism could be used to control the direction of thrust produced by trolling unit 102.

Trolling unit 102 includes a heading detector 206 coupled to control circuit 200 via a transducer cable 208. Signals generated by heading detector 206 are used by control circuit 200 for determining the actual heading of fishing boat 100. In a preferred embodiment, heading detector 206 is a compass mounted in motor head 106 which generates signals which are related to the orientation of shaft 110, and are therefore related to the direction of thrust produced by electric trolling motor 120. These signals are related to the actual heading of fishing boat 100 since trolling unit 102 produces thrust to propel fishing boat 100 in a direction generally opposite to the direction of thrust. Heading detector 206 may resemble detectors of known design, such as those described in the incorporated patents. The compass could include a flux gate compass or other type of compass.

Other types of heading detectors can be used. For example, heading detector 206 could include a compass mounted to fishing boat 100 and configured to produce signals related to the orientation of fishing boat 100. These signals are also related to the actual heading of fishing boat 100 since fishing boat 100 typically travels forwardly along the direction of its orientation as electric trolling motor 120 produces thrust to pull fishing boat 100. As another example, control circuit 200 could include a heading detector 206 which calculates the actual heading of fishing boat 100 by detecting the position of fishing boat 100 at different times and calculating the direction from an earlier position to a later position. This type of heading detector 206 would include the advantage of not requiring a separate compass or other transducer. As still another example, heading detector 206 could include a potentiometer configured to generate signals related to the orientation of trolling motor 120.

Control circuit 200 receives electrical power through cable 124 and supplies electrical power to electric trolling motor 120 via a cable 210. Cable 210 passes from control circuit 200 through motor head 106 and down through shaft 110 to electric trolling motor 120. As explained below, control circuit 200 provides the ability to control the electrical power provided to electric trolling motor 120, thereby allowing trolling unit 102 to control both the magnitude and the direction of thrust produced by propeller 114.

Trolling unit 102 includes a data entry device 212 and an optional remote data entry device 214 coupled to control circuit 200. Data entry devices 212 and/or 214 provide signals to control circuit 200 related to operator-selectable parameters such as waypoints, desired thrust, desired speed, operating mode and/or automatic waypoint storage enable. Data entry device 212 typically includes at least one switch or a keypad mounted to base housing 108. Mounting data entry device 212 to base housing 108 further increases the integration of trolling unit 102, thereby decreasing cost and increasing reliability. In one embodiment, data entry device 212 includes a switch for setting waypoints at the actual position of the boat when the switch is activated. By selectively activating the switch, typically at turns, an operator sets desired waypoints as fishing boat 100 is navigated through a suspected fish habitat or route of travel. In another embodiment, data entry device 212 includes a keypad for selecting waypoints by entering data representative of waypoints. The keypad allows an operator, for example, to plot a navigation route on a chart, determine the longitude and latitude of successive positions around the navigation route, and enter the longitude and latitude of the waypoints. Alternatively, data entry device 212 could include an electronic chart. The electronic chart would allow an operator to select a desired navigation route, and then command the electronic chart to download waypoints. For example, an operator could select a navigation route following a certain depth contour and command the electronic chart to automatically download digitized waypoints around the navigation route. Remote data entry device 214 is similar to data entry device 212, except that remote data entry device 214 is not mounted to base housing 108. Remote data entry device 214 communicates with control circuit 200 via a cable, or via an infrared or radio frequency interface (not shown). Remote data entry device 214 allows an operator to set parameters from different locations in fishing boat 100.

As another alternative, data entry device 212 could include a memory storage device and a reader. For example, one or more navigation routes could be stored on a CD-ROM or other non-volatile memory. An operator could insert the CD-ROM into a reader and use the reader to generate waypoint signals corresponding to a selected navigation route.

Trolling unit 102 includes a position detector 216 for detecting the actual position of fishing boat 100. Position detector 216 may include a global positioning system (GPS) receiver for receiving position signals transmitted by the GPS network of satellites through antenna 218. Position detector 216 may also include a differential global positioning system (DGPS) receiver for receiving position correction signals from one of a number of DGPS transmitters operated by the Coast Guard and other service providers. Position detector 216 provides signals related to the actual position of fishing boat 100 to control circuit 200. These signals may be formatted according to the National Marine Electronics Association (NMEA) 0183 standard or in another format. Control circuit 200 may include a signal processing algorithm to process the GPS data to provide a position signal sufficiently accurate to eliminate the need for DGPS correction signals, thereby simplifying and decreasing the cost of trolling unit 102. Alternatively, position detector 216 may use a triangulation technique to determine the actual position. For example, digital audio broadcasting signals including positioning data could be used to detect actual position.

In a preferred embodiment, GPS/DGPS receiver 216, steering motor 202 and control circuit 200 are mounted within base housing 108. Data entry device 212 is mounted on a surface of base housing 108 for access by the operator. This integration decreases the cost and increases the reliability of trolling unit 102 by eliminating the need for extra connectors and cabling. This design also increases the convenience of trolling unit 102 by creating a single unit that can be easily mounted and dismounted from fishing boat 100. steering motor 202 could also be mounted within motor head 106 and steering accomplished by a shaft-in-tube structure as well known in the art.

Referring to FIG. 3, trolling unit 102 includes a processor 300 coupled to a memory 302. Processor 300 typically includes a microprocessor or microcontroller. Memory 302 typically includes non-volatile memory for storing program instructions executed by processor 300, such as a read only memory (ROM). Memory 302 also typically includes volatile memory, such as a random access memory (RAM), for storing data and variables including the waypoints representing successive positions along a desired navigation route. Memory 302 may exist on the same integrated circuit as processor 300 or on different integrated circuits. Processor 300 provides signals to steering circuit 304 via line 306 to control the orientation of electric trolling motor 120. In response to these signals, steering circuit 304 provides signals to steering motor 202 to rotate shaft 110. Steering circuit 304 and steering motor 202 may resemble those of known design, such as those described in the incorporated patents.

Processor 300 receives signals from position detector 206 as conditioned by autopilot circuit 308 and received through interface 310. Autopilot circuit 308 provides analog signals related to the heading detected by compass 206 to an analog-to-digital converter included in interface 310. An optional speed sensor 312 may be used to provide signals related to the speed of fishing boat 100 relative to a body of water. These signals are converted into a digital format through an appropriate circuit in interface 310.

Processor 300 receives signals related to the actual position of fishing boat 100 from GPS unit 314 and/or DGPS unit 316. These signals are conditioned by an appropriate circuit 318 and are read by processor 300 through interface 320.

Processor 300 provides appropriate thrust control signals to output driver circuit 322 through line 324. The control signals may be pulse-width-modulated (PWM) signals and output driver circuit 322 includes a power driver stage using power drivers such as FETs. In response to the control signals, output driver circuit 322 provides control signals to electric trolling motor 120 via cable 326. PWM signals allow processor 300 to control the power supplied to electric trolling motor 120, thereby providing control over the magnitude of thrust provided by propeller 114.

Processor 300 receives operator-commanded signals from manual speed input device 326, manual steering input device 328 and mode select device 330. Manual speed input device 326 allows an operator to manually input a desired speed of fishing boat 100. Processor 300 can be configured to interpret the signals from manual speed input device 326 as a desired magnitude of thrust, such that manual speed input device 326 is similar to a throttle typically used on fishing boats. Processor 300 can also be configured to interpret the signals from manual speed input device 326 as a desired speed of fishing boat 100. Processor 300 may compare the desired speed of fishing boat 100 to an actual speed to generate the control signal to output driver circuit 322 to maintain the actual speed at the desired speed. The actual speed used as a feedback may be the absolute speed of fishing boat 100 determined by processor 300 based upon the distance between successive positions detected by position detector 216 divided by the elapsed time between detecting successive positions. Processor 300 could also determine the actual speed of fishing boat 100 relative to a body of water using the signals generated by speed sensor 312. The operator uses manual steering input 328 to select the waypoint positions as described above. The operator uses mode select device 330 to set a mode of operation as described further below.

Electric power for the various components of trolling unit 102 is provided by an appropriate power supply circuit 332. Power supply circuit 332 receives electrical energy from battery 122 via cable 124.

In operation, an operator selects a desired navigation route by entering a number of waypoints into the system. An operator may select the navigation route in reference to a chart, determine successive waypoints around the route, and enter the longitude and latitude of each waypoint into the system using data entry device 212 or 214. The waypoints may be entered via a keypad or by downloading from an electronic chart. Alternatively, an operator may manually navigate fishing boat 100 around the navigation route and activate data entry device 212 or 214 upon arriving at each waypoint. An operator may also enable automatic waypoint storage using data entry device 212 or 214 as fishing boat 100 is manually navigated around the navigation route. When enabled, the system automatically generates waypoints at the actual position of fishing boat 100 at predetermined time or distance intervals. For example, waypoints could be generated at 30 second or 10 foot intervals. The time intervals could also be dependent on a rate of change in heading. The system could also automatically generate waypoints when a turn is detected based upon a change in the actual heading of fishing boat 100 or based upon the steering control signal. Once generated, the system stores the waypoints in memory 302. The operator disables automatic waypoint storage when the navigation route is completed.

Once waypoints are selected, the operator can choose to automatically navigate between the waypoints. Control circuit 200 is configured to determine a desired heading of fishing boat 100 based upon a desired waypoint and the actual position of fishing boat 100. Once the desired heading is determined, the system generates a control signal based upon a difference between desired and actual heading. The control signal is applied to steering motor 202 to rotate shaft 110 and change the direction of thrust produced by electric trolling motor 120 and propel fishing boat 100 along the direction of the desired heading. Thus, the system provides closed-loop control to steer fishing boat 100 from the actual position to the desired waypoint.

Alternatively, instead of steering a direct course between waypoints, the system could be programmed to operate fishing boat 100 to travel in a predetermined pattern between successive waypoints. For example, the system could steer fishing boat 100 repeatedly from a distance on one side of an imaginary line between the waypoints to a distance on the other side of the line as the boat generally advances to the next waypoint (i.e., zigzag). Thus, an operator could fish a two-dimensional surface area between the successive waypoints.

At times, an operator may manually steer fishing boat 100 away from a course between successive waypoints in order to avoid an obstacle, such as a rock, tree, or another boat. The system can be programmed to automatically return fishing boat 100 to the original course between the successive waypoints before resuming the original heading. This "resume" mode of operation allows an operator to return to the navigation route that would have been followed "but for" the deviation.

As described above, the system can also control the thrust produced by electric trolling motor 120. As described above, an operator may set either a desired magnitude of thrust or a desired speed. In addition, the system can be configured to modify the thrust control signals based upon a predetermined relationship between the actual position of fishing boat 100 and a desired waypoint. For example, the system could modify the thrust control signals to gradually decrease the speed of fishing boat 100 as it nears the desired waypoint. The gradual decrease in speed may help avoid overshoot or undershoot of the desired waypoint, and may reduce deceleration forces on the operator to avoid throwing the operator off balance or out of the boat.

The system can be programmed to operate in various manners once fishing boat 100 arrives at a point substantially near a desired waypoint. The system may shut off electric power and turn off electric trolling motor 120 at the desired waypoint. Alternatively, the system may control both steering motor 202 and electric trolling motor 120 to maintain fishing boat 100 at a position substantially near the desired waypoint. The system proceeds to the next waypoint after an operator input is received or a predetermined amount of time has elapsed. As another alternative, the system may select the next waypoint and automatically steer fishing boat 100 towards the next waypoint. To avoid turning sharply at a relatively high speed, the system may modify the thrust control signal to decrease the speed of fishing boat 100 based upon the rate at which fishing boat 100 is turning, determined from the steering control signal or the difference between the desired and actual heading.

The system may also be programmed to operate in a number of modes once fishing boat 100 arrives at the end of a selected navigation route. The particular mode of operation may be selected with mode select device 330. For example, the system could shut off electric trolling motor 120. Alternatively, the system could repeat the navigation of fishing boat 100 around the navigation route, in either forward or reverse order. Repeating the navigation route in reverse order is also useful for returning to a boat launching pad or dock. As another alternative, the system could circle the last waypoint at a set distance, or maneuver the boat in another pattern upon arriving at the last waypoint.

While the embodiments illustrated in the FIGURES and described above are presently preferred, it should be understood that these embodiments are offered by way of example only. For example, the system could be configured to allow an operator to create and store a number of navigation routes in a non-volatile writable portion of memory 302 and to assign each route a unique identifier. The operator could create a navigation route on one occasion and then select the navigation route on future fishing trips. The invention is not intended to be limited to any particular embodiment, but is intended to extend to various modifications that nevertheless fall within the scope of the appended claims.

What is claimed is:

1. A system for controlling the navigation of a fishing boat between a plurality of waypoints representing successive positions along a navigation route, the system comprising:

a first input device for generating waypoint signals;

a position detector for generating signals representative of the actual position of the fishing boat;

an electric trolling motor coupled to the fishing boat and producing a thrust to propel the fishing boat;

a steering actuator coupled to the electric trolling motor and configured to control the orientation of the electric trolling motor in response to a steering control signal;

a heading detector for generating signals related to the actual heading of the fishing boat; and a control circuit coupled to the first input device, the position detector, the steering actuator and the heading detector, the control circuit being configured to determine the plurality of waypoints based upon the waypoint signals generated by the first input device and to determine the actual position of the fishing boat based upon the signals generated by the position detector, the control circuit being further configured to determine a desired heading based upon a desired waypoint and the actual position of the fishing boat, and to generate the steering control signal to steer the fishing boat toward the desired waypoint based upon the desired heading and the actual heading of the fishing boat, wherein the control circuit steers the fishing boat between the plurality of waypoints representing the successive positions along the navigation route.

2. The system of claim 1 wherein the control circuit is further configured to determine the waypoints based upon the actual position of the fishing boat when the first input device is manipulated.

3. The system of claim 2 wherein the first input device includes a switch.

4. The system of claim 1 wherein the first input device generates signals representative of the waypoints.

5. The system of claim 4 wherein the first input device generates signals representative of the longitude and latitude of the waypoints.

6. The system of claim 1 wherein the first input device includes a keypad.

7. The system of claim 1 wherein the control circuit includes a memory for storing the waypoints.

8. The system of claim 1 wherein the position detector receives position signals from at least one transmitting device.

9. The system of claim 8 wherein the position detector receives position signals from at least two satellites.

10. The system of claim 9 wherein the position detector includes a global positioning system receiver.

11. The system of claim 9 wherein the position detector includes a differential global positioning system receiver.

12. The system of claim 1 wherein the electric trolling motor is configured to be mounted on the bow of the fishing boat.

13. The system of claim 1 wherein the thrust produced by the electric trolling motor is disposed to pull the fishing boat.

14. The system of claim 1 wherein the steering actuator includes a steering motor.

15. The system of claim 1 wherein the heading detector includes a compass.

16. The system of claim 1 wherein the heading detector generates signals related to the direction of thrust produced by the electric trolling motor.

17. The system of claim 1 wherein the heading detector generates signals related to the orientation of the fishing boat.

18. The system of claim 1 wherein the heading detector includes a circuit for determining the actual heading of the fishing boat based upon a change in the actual position.

19. The system of claim 1 wherein the magnitude of the thrust produced by the electric trolling motor is variable in response to a thrust control signal, and the control circuit is coupled to the electric trolling motor and is further configured to generate the thrust control signal.

20. The system of claim 1 further comprising a housing coupled to the electric trolling motor wherein the position detector, the steering actuator and the control circuit are located within the housing.

21. The system of claim 20 wherein the first input device is mounted on a surface of the housing.

22. The system of claim 1 further comprising a housing coupled to the electric trolling motor wherein the position detector is external to the housing.

23. The system of claim 1 wherein the control circuit is configured to steer the fishing boat in a predetermined pattern between successive waypoints.

24. The system of claim 1 wherein the control circuit is configured to steer the fishing boat in a predetermined pattern when the fishing boat arrives at the desired waypoint.

25. The system of claim 1 wherein, when the fishing boat deviates from a desired course between successive waypoints, the control circuit is configured to steer the fishing boat substantially back to the desired course before resuming steering to the next waypoint.

26. A system for controlling the navigation of a fishing boat between a plurality of waypoints, the system comprising:

a position detector for generating signals representative of the actual position of the fishing boat;

an electric trolling motor coupled to the fishing boat and producing a variable magnitude of thrust to propel the fishing boat in response to a thrust control signal;

a steering actuator coupled to the electric trolling motor and configured to control the orientation of the electric trolling motor in response to a steering control signal;

a heading detector for generating signals related to the actual heading of the fishing boat;

an input device; and a control circuit coupled to the position detector, the electric trolling motor, the steering actuator, the heading detector, and the input device, the control circuit being configured to determine the actual position of the fishing boat based upon the signals generated by the position detector and to determine a desired heading based upon a desired waypoint and the actual position of the fishing boat, the control circuit being further configured to generate the thrust control signal and the steering control signal to navigate the fishing boat to the desired waypoint, wherein the control circuit generates the thrust control signal based at least upon signals generated by the input device.

27. The system of claim 26 wherein, when the fishing boat arrives substantially at the desired waypoint, the control circuit generates the steering and the thrust control signals to maintain the fishing boat substantially near the desired waypoint.

28. The system of claim 26 wherein the signals generated by the input device represent a desired magnitude of thrust.

29. The system of claim 26 wherein the signals generated by the input device represent a desired speed of the fishing boat, and the control circuit generates the thrust control signal based upon the desired speed and an actual speed of the fishing boat.

30. The system of claim 29 wherein the actual speed of the fishing boat is an absolute speed based upon a derivative of the signals generated by the position detector.

31. The system of claim 29 further comprising a sensor coupled to the control circuit for sensing the speed of the fishing boat relative to a body of water, wherein the actual speed of the fishing boat is the speed relative to the body of water.

32. The system of claim 26 wherein the control circuit modifies the thrust control signal based upon a predetermined relationship between the actual position of the fishing boat and the desired waypoint.

33. The system of claim 26 wherein the control circuit modifies the thrust control signal to gradually decrease the speed of the fishing boat as the fishing boat nears the desired waypoint.

34. The system of claim 26 wherein the control circuit modifies the thrust control signal based upon the rate at which the fishing boat is turning.

35. The system of claim 26 wherein, when the fishing boat arrives substantially at the desired waypoint, the control circuit generates the thrust control signal to turn off the electric trolling motor.

36. A system for controlling the repeated navigation of a recreational boat around a navigation route, the navigation route including a plurality of waypoints representing successive positions along the navigation route, the system comprising:

a position detector for generating signals representative of the actual position of the boat;

a propulsion unit coupled to the boat and producing a thrust to propel the boat;

a steering mechanism configured to control the direction of the thrust produced by the propulsion unit in response to a steering control signal;

a mode select device; and a control circuit coupled to the position detector, the steering mechanism, and the mode select device, the control circuit being configured to determine the actual position of the boat based upon the signals generated by the position detector, to generate the steering control signal to steer the boat between successive waypoints along the navigation route, and to repeat the navigation of the boat around the navigation route in at least one mode of operation based upon a signal from the mode select device.

37. The system of claim 36 wherein the propulsion unit comprises an electric trolling motor.

38. The system of claim 36 wherein, in one mode of operation, the control circuit generates the steering control signal to steer the boat in reverse order around the navigation route after the boat arrives at an end of the navigation route, whereby the navigation route is repeated in reverse order.

39. The system of claim 36 wherein, in one mode of operation, the control circuit generates the steering control signal to steer the boat in a continuous loop around the navigation route, whereby the navigation route is repeated in the same order.

40. A system for controlling the navigation of a recreational boat between a plurality of waypoints representing successive positions along a navigation route, the system comprising:

an input device for enabling automatic waypoint storage;

a position detector for generating signals representative of the actual position of the boat;

a motor coupled to the boat and producing a thrust to propel the boat;

a steering mechanism configured to control the direction of the thrust produced by the motor in response to a steering control signal; and a control circuit coupled to the input device, the position detector and the steering mechanism, the control circuit including a memory for storing the waypoints, the control circuit being configured to determine the waypoints based upon the actual position of the boat and to store the waypoints in the memory without operator intervention when automatic waypoint storage is enabled, the control circuit being further configured to generate the steering control signal to steer the boat from the actual position of the boat to a desired waypoint, wherein the control circuit steers the boat between the plurality of waypoints representing the successive positions along the navigation route.

41. The system of claim 40 wherein the control circuit generates waypoints when a turn is detected and automatic waypoint storage is enabled.

42. The system of claim 40 wherein the control circuit generates waypoints at predetermined time intervals when automatic waypoint storage is enabled.

43. The system of claim 40 wherein the control circuit generates waypoints at variable time intervals when automatic waypoint storage is enabled, the time intervals depending on a rate of change in heading.

44. The system of claim 40 wherein the control circuit generates waypoints at predetermined distance intervals when automatic waypoint storage is enabled.

* * * * *